United States Patent [19]

George

[11] Patent Number: 4,501,055
[45] Date of Patent: Feb. 26, 1985

[54] TOOL FOR COUPLING PIPE SECTIONS

[76] Inventor: Leroy George, 7915 West Orangewood, Glendale, Ariz. 85303

[21] Appl. No.: 566,780

[22] Filed: Dec. 29, 1983

[51] Int. Cl.³ .............................................. B23P 19/04
[52] U.S. Cl. ..................................................... 29/237
[58] Field of Search ............... 29/237, 282; 254/29 R, 254/226, 223, 225, 241, 399, 398

[56] References Cited

U.S. PATENT DOCUMENTS

| 2,920,383 | 1/1960 | Aydelott | 29/237 |
| 3,435,507 | 4/1969 | Pronovost | 29/237 |
| 4,178,668 | 12/1979 | George | 29/237 |

Primary Examiner—James L. Jones, Jr.
Attorney, Agent, or Firm—Gregory J. Nelson

[57] ABSTRACT

A pipe tool for assembly pipe particularly the type having a collar or fitting containing a seal which must be brought into engagement with the free end of the next section or joint. The tool includes a first pipe engaging member having a collar engageable about the pipe in abutment with a collar of a pipe section in place. A winch and cable are attachable to a second pipe tool engageable at the free end of the section or joint to be placed. Actuation of the winch will bring the section into sealing engagement with the collar. The yoke and collar of the second tool are also pivotable to provide an additional joining force. A bearing plate is securable at the collar of the second pipe engaging tool to abut the end of the pipe section and when removed permits the collar to engage the exterior of the pipe abutting a fitting on the pipe.

6 Claims, 8 Drawing Figures

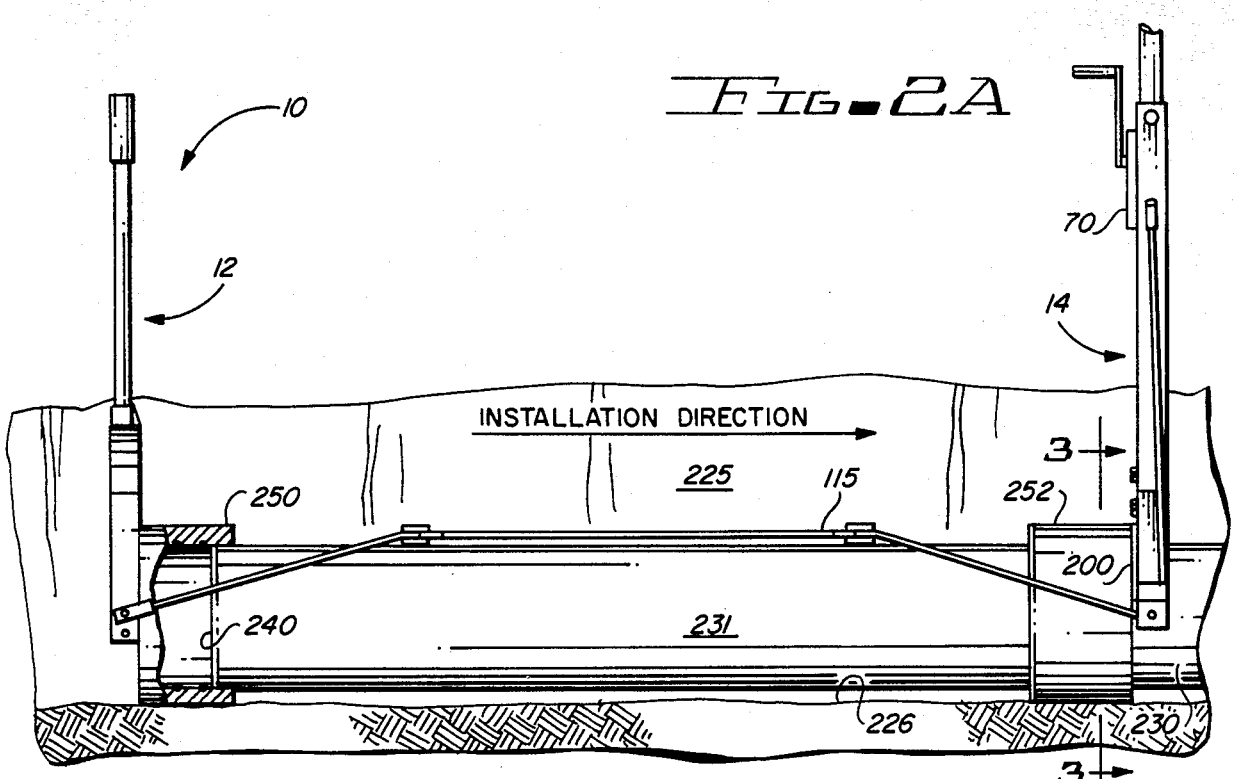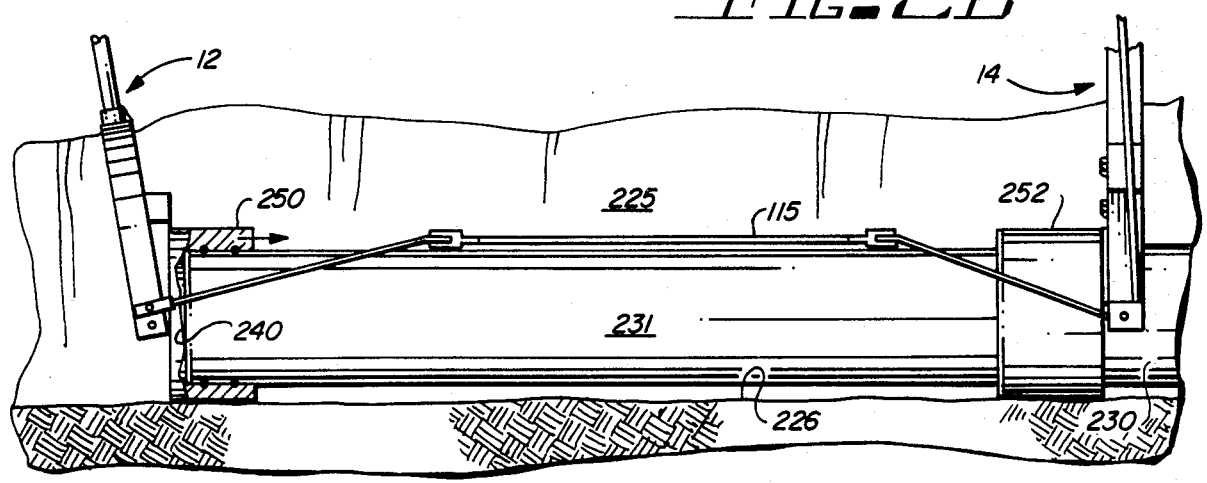

TOOL FOR COUPLING PIPE SECTIONS

The present invention relates to an apparatus for joining sections of pipe and more particularly relates to a pipe tool for applying axial forces to join sections of pipe such as cast iron pipe, transite pipe and similar conduit.

In the past, the pipe industry utilized pipes which were joined together by placing the mating ends of the individual joints or sections in engagement and applying a suitable caulking or lead material to seal the joint. These pipes are used primarily for sanitary applications and in other low pressure applications. The practical difficulties encountered in this type of construction are substantial. Accordingly, various types of pipe having a flexible or elastomeric sealing element formed as an integral part of the pipe have become common in the trade. The elastomeric seal is of suitable composition, shape and dimensions to provide an effective seal when mating pipe sections are joined together. The elastomeric seal is deformed to provide a highly satisfactory seal as well as a strong mechanical connection between the joined sections of the pipe. Typically this type of seal is used in connection with pipe having a collar which contains the seal. When the end of a pipe section is forced into the collar, the seal deforms. This type of pipe is typically concrete vitrified clay or transite pipe for water mains and sanitary sewers applications.

One problem in utilization of joints of this type has been the installation of the pipe. As mentioned above, substantial axial force must be applied to pipe joints or sections to force the the adjacent pipe sections together to effect the seal. Conventional practice has been to manually apply the force by use of manual tools such as crowbars, come-alongs and jacks. Such manual devices, in many cases, are suitable for smaller diameter pipes but are not sufficient to create the force necessary to join larger pipe sections. Even with smaller diameter pipes, problems occur as the workmen have limited space available in the trenches so it becomes difficult to work the pipe into place. Breakage of the pipe is also a problem, particularly if the pipe is concrete or vitrified clay. Since pipe sections are expensive, the breakage of joints can represent a substantial increase in the cost of the job to the owner and contractor in direct material costs as well as delays occasioned by having to remove the broken pipe and replace the broken section with a new pipe section.

To overcome problems of the type mentioned above, various tools and devices have been suggested in the prior art for joining sections of pipe. Generally these devices include some type of operating lever coupled to a chain or cable. To join the pipe, a chain is connected to the pipe by a clamp or length of chain extended around the pipe. The chain is pulled taut and the pipes are pulled into mating engagement. However, tools of this type have disadvantages or deficiencies in that they require substantial working space and generally require at least a piece of the apparatus extend around the pipe. This necessitates manual excavation to place the tool in an operating position. Confined working space often makes operation of these tools difficult, if not impossible due to their size and weight. Further, these devices generally are not adaptable to use with transite and similar pipe which utilizes a sliding collar to affect the sealing relationship between adjacent pipe sections. Typical prior art devices are disclosed in U.S. Pat. Nos. 3,665,579; 3,257,714; 3,927,457; 3,229,496; 3,096,572; 3,988,819 and 3,494,016.

A particularly efficient pipe tool is shown in my prior patent, U.S. Pat. No. 4,178,668. This device works particularly well for spigot type pipe however, is not adapted for the type having a collar such as concrete and transite pipe.

Accordingly, there exists a need in the prior art for an efficient pipe tool which can be used with all common types of pipe and which will effectively serve to join pipe sections effectively and efficiently.

Briefly, the present invention provides a portable, light-weight and easily operable apparatus tool for joining and sealing pipe sections of various diameters and of various configurations which is particularly adapted to join concrete-type pipe having a collar housing an elastomeric seal. The pipe tool of the present invention comprises a first pipe engaging member having a semi-circular yoke or collar which can be engaged about a portion of the periphery of the pipe. An upstanding handle which may be fitted with extensions is secured to the yoke. A cable assembly is carried on the first member and actuable by a winch. A second pipe engaging member similarly has a generally semi-circular pipe engaging yoke which is adapted to be placed in a spaced apart relationship from the first member. A generally U-shaped frame member having a handle and accomodates extensions is pivotable relative to the yoke. A cable attaches to the frame and when the first and second pipe engaging members are placed at selected locations on the pipe as for example with the first member abutting the collar of a section in place and a second member at the end of the pipe section to be layed. The pipe sections will be urged into mating engagement as the winch is actuated. A detachable plate member is securable across the face of the yoke of the second pipe engaging member to provide a bearing surface which is engageable against the end of a pipe. The plate can be removed so the collar of the second member can be engaged at the periphery of the pipe abutting a bell or similar projection on the pipe for some applications. This design provides great versatility so the pipe tool can be used with straight pipe sections or with various fittings such as T's, elbows and the like. Also this permits the device to be used with a wide variety of shapes and types of pipe.

The above-mentioned advantages and features of the present invention will be more readily appreciated from the following description of the invention which may be had by reference to the specific embodiments illustrated in the appendant drawings, which drawings form a part of the specification as follows:

FIGS. 2A to 2C are elevational views illustrating the use and application of the pipe tool of the present invention to a pipeline;

Figure 1:
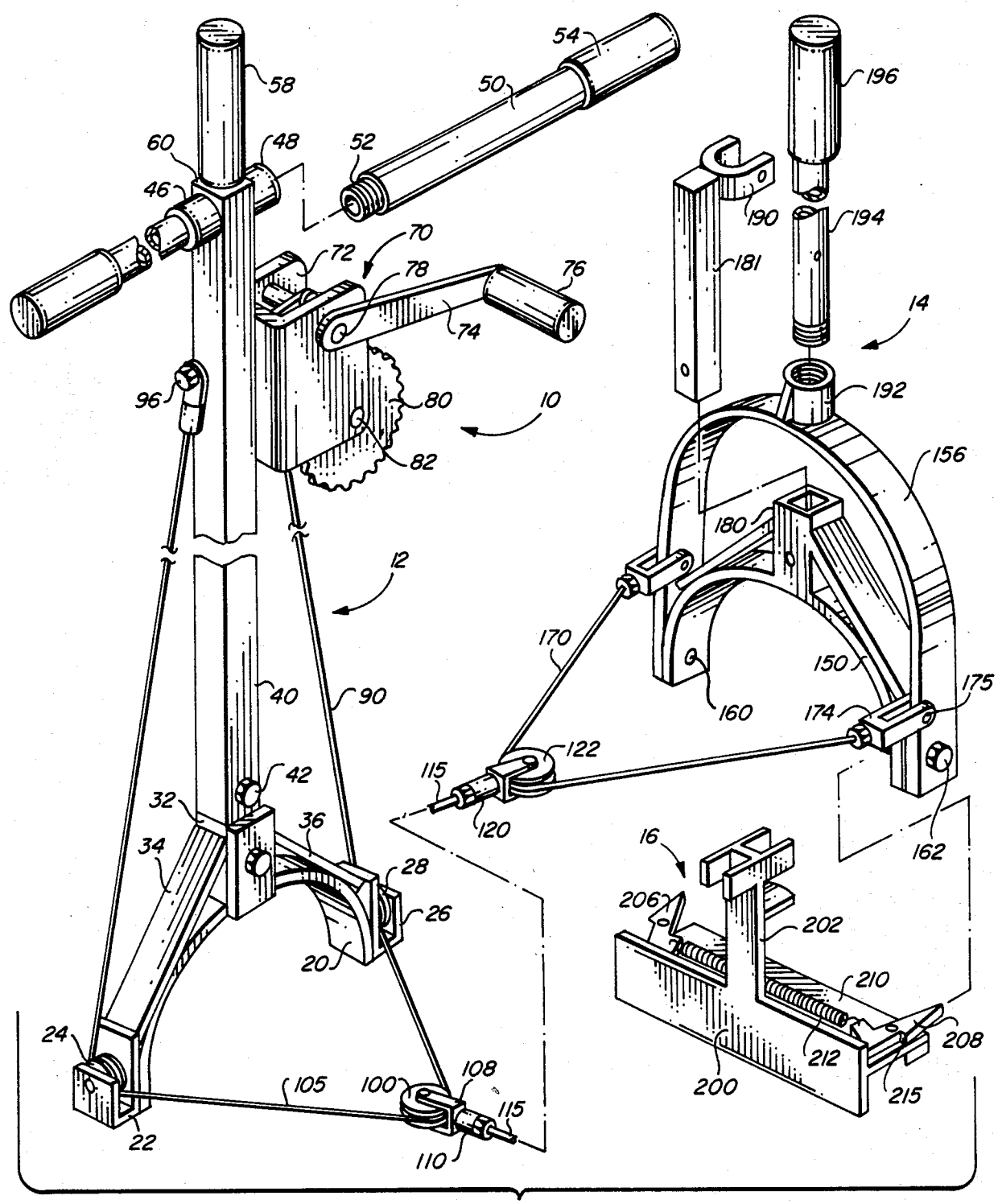
FIG. 1 is a perspective view illustrating the various major components or elements of the pipe tool of the present invention.
Figure 4:
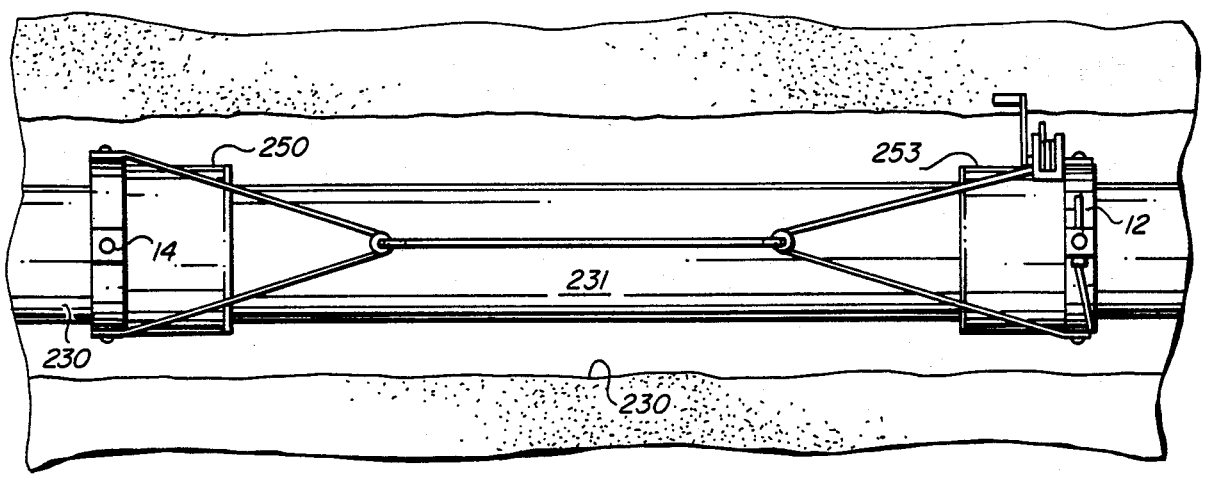
FIG. 4 is a plan view of the pipe tool of the present invention applied to a section of pipeline.
Figure 3:
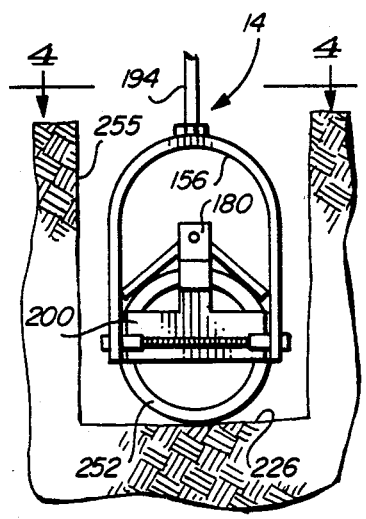
FIG. 3 is a sectional view taken along lines 3—3 of FIG. 2A.

Turning now to the drawings, the preferred embodiment of the pipe tool is shown in FIG. 1 and is generally designated by the numeral 10. In FIG. 1, the pipe coupling tool of the present invention is shown as having three basic components including the first pipe engaging member 12, second pipe engaging member 14 and detachable bearing plate section 16.

The first pipe engaging member 12 comprises a generally semi-circular collar 20 which is adapted to be placed in engagement about a portion of the periphery of a pipe section. A generally U-shaped bracket member 22 is secured at the outside of the collar at one terminal end. Pulley 24 is rotatably positioned within the bracket 22. Similarly, a bracket 26 and (associated rotable) pulley member 28 is secured at the outer side of the opposite end of collar 20. A coupling member, 32 shown as being generally rectangular in cross-section, is vertically positioned at the midpoint of the collar to receive a handle 40. Angular brace members 34 and 36 extend between the collar and bracket members 22 and 26, respectively. Generally vertically extending tubular handle 40 has a lower end which is in mating engagement with collar 32. Mechanical fastener 42 extends into collar 32 to secure the handle 40 in place. Accordingly, a handle of desired length may be positioned to the yoke assembly in accordance with the requirements of the particular application. For example, in some deeper trench work, a longer handle 40 may be required. The upper end of the handle is provided with two transverse oppositely extending fittings 46 and 48 each internally threaded. These fittings are adapted to receive handle extensions 50 which have an inner threaded at 52 adapted to be placed in threaded engagement with fittings 46 and 48. The outer of handle extension 50 is provided with a suitable grip 54. In similar manner, a vertical extension 58 may be placed in threaded engagement with internally threaded bore 60 vertically positioned at the upper end of handle 40. It will be appreciated that the handle can be varied in length and various extension handles attached thereto as required by the individual requirements of the installation and preference of the workman.

The first pipe engaging member 12 is provided with a winch assembly 70 which includes a generally U-shaped bracket 72 secured at an intermediate location along vertical handle member 40. The winch assembly includes a crank arm 74 having a handle 76. The crank arm is adapted to rotate shaft 78 which through one or more gears 80 rotates a spool shaft 82 which carries a take-up spool or reel. The winch may be locked in the desired by a detent, not shown, which is well known in the art.

One end of a cable 90 is secured to the cable reel shaft 80. The cable is trained under pulleys 24 and 26 and the opposite end is secured to handle 40 opposite the winch assembly by a mechanical fastener 92. A pulley 100 engages the section of cable between pulleys 24 and 28 so a generally V-shaped bridle section 105 is produced when axial force is imposed on the pulley 100 as shown in FIG. 1. Pulley 100 includes a U-shaped bracket 108 to which attaches a cable connector 110. Cable section 115 has one end connected to connector 110.

The opposite end of cable section 115 is connected to cable connector 120 which is a part of the pulley assembly 122 associated with a second pipe engaging member 14 shown in FIG. 1. The second pipe engaging member 14 includes a generally semi-circular collar 150 which is adapted to complimentary engage the exterior surface of a portion of the outer diameter of a section of pipe. A generally horseshoe-shaped yoke 156 is disposed in approximate parallel arrangement with yoke 152 having the lower end pivotally connected to the collar at 160 and 162. A flexible cable 170 extends around pulley 122 having the opposite ends secured to yoke 152 by a pair of clevis attachments 174, each being pivotally connected to the yoke. Thus cable section 170 forms a generally V-shaped bridle. The clevis attachments 174 are secured to the yoke 152 at a pivot pin 175. Note that pivot pins 175 are disposed above and offset from pivot connections 160 and 162 in a direction toward the bridle 170. This will provide a "camming" action as will become more apparent hereafter.

Collar 150 is provided with a vertically extending box-like coupling section 180 at its midpoint. Coupling 180 is adapted to secure an elongate shaft extension 188 which may also include a fitting 190 which serves to lock the collar 150 and yoke 152 as a unitary member for some applications.

Internally threaded fitting 192 extends vertically from the midpoint of yoke 152 and is adapted to receive a handle 194 having lower threaded section 195. The upper end of handle 194 is provided with a grip 196. The length of the handle 194 varies with the job application.

Figure 5:
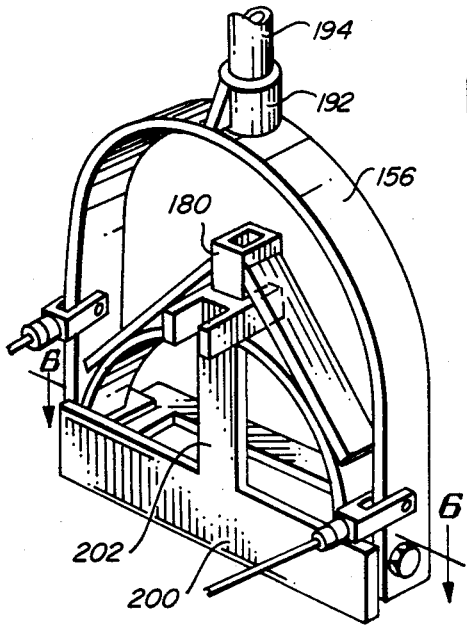
FIG. 5 is a detailed perspective view of one of the pipe engaging members with the removable plate in place.

The detachable plate member 16 is shown in FIG. 1 in a detached position and in FIG. 5 attached to the second pipe engaging member 14. The detachable plate member 16 is put in place when the second member 14 is to be used in a position engaging the end of a section of pipe to provide additional load bearing surface. The detachable plate member 16 includes a generally rectangular face plate 200 having an upwardly projecting arm 202 which carries a bracket 204 at its upper end. Bracket 204 is generally H-shaped so as to engage the base portion of the bracket 180 as best seen in FIG. 5.

Face plate 200 has a transverse or longitudinal dimension sufficient to extend across the opening of yoke 152 and engage the lower opposite ends of the yoke. The face plate is detachably retained by latch members 206 and 208 which are each pivotally secured to mounting plate 210 extending from the rear of plate 200 at generally perpendicular thereto. Latches 206 and 208 are interconnected by a compression spring 212 so that the tooth portion 215 of each latch is outwardly biased. As best seen in FIG. 5, when the plate assembly is positioned with the bracket 204 engaging the coupling 190 and with the face plate extending transversely across the face of the yoke, the teeth 206 and 208 will engage the rear side of yoke 150 securing the detachable plate 16 in position. If it is desired to remove the plate, the latches or pawls can be depressed inwardly to release the plate.

The device of the present invention will be more fully understood from the following description of operation. Reference is made to FIGS. 2A through 2C, FIG. 3 and FIG. 4.

The pipe tool of the present invention generally can be provided the user in several sizes. The size of the pipe engaging collars 20 and 150 should generally correspond to the diameter of the pipe to be installed although a precise or tight fit is not necessary. In use, the device may be used by workmen in the trench in which case shorter handles 40 and 194 would be selected. In many installations, it is possible for longer extension handles to be secured to the pipe engaging members to allow the workmen to work outside of the trench which greatly facilitates installation due to the general lack of space in the trench. Further, installation from a location exterior of the trench is also highly desirable from a safety standpoint in the event of a cave-ins of the trench sidewalls.

Referring to FIGS. 2A through 2C, the trench 225 is first evcavated having a bottom 226. A pipe line is being installed in the direction of the arrow indicated by the letter A. Pipe section 230 has been installed in place and section 231 is next in line for installation. Working from the outside of the trench, a pipe section 231 can be lowered in place by appropriate ropes 232. Pipe section or joint 231 is shown as a conventional transite pipe having generally cylindrical body. One end of the pipe 240 is straight, that is is not provided with any fitting. The opposite end of the pipe is provided with a coupling 252 which is similar to coupling 250 on pipe section 230. The interior of couplings 250 and 252 are provided with one or more elastomeric seals 254. Once the right end of pipe section 231 is placed within interior coupling 250, the joint is completed by moving the pipe section rightward as seen in FIG. 2A which brings the end 240 of pipe section 231 into engagement with the interior seals 254.

Using the tool of the present invention, pipe engagement is accomplished by placing the first pipe engaging member 12 in abutment with coupling 250 and in engagement with pipe section which is in place. New section 231 has been positioned using ropes 232 with end 240 aligned and loosely engaging the interior of collar 250. The second pipe engaging member 14 is placed at the free end of pipe section 231. The bearing plate member 16 is positioned so plate 200 extends across the approximate horizontal centerline of the pipe end. The first and second pipe engaging sections are interconnected by cable 115 attached to the respective bridle connections 105 and 170. Winch 70 is actuated through crank arm 74 at handle 76 to cause cable 115 to be pulled taut. The winch is further actuated which will cause pipe section 231 to move to the right as seen in FIG. 2A bringing the pipe into sealing engagement within collar 250. To achieve additional joining force, the second pipe engaging member is provided with a camming action which is achieved by rotation of handle or lever 194. Since an offset exists between pivot points 162 between the yoke and collar and the point of attachment 175 of the cable bridle, clockwise rotation of lever 194 will cause the pipe engaging collar to move to the left as seen in FIG. 2B. This applies an additional joining force which may be necessary in some instances. In other instances, it may be desirable and necessary only to use the winch to pull the pipe into place. In this event, handle 194 can be connected to collar 150 at connection 190 so the yoke and collar act as a single unitary device.

Once pipe section 231 is in place, the next adjacent pipe section can be positioned with its end in engagement with collar 252 and the pipe engaging member remove and advance to the next position for securing the next pipe joiner length in position.

In the event other types of pipe are being laid such as cast iron having a bell, the device can be used in the same manner with the collar of the first pipe engaging member placed in engagement behind the bell portion of the pipe which has previously been laid. The second pipe engaging member can be engaged at the free or unconnected end of the pipe section to be place in position in an operation carried out as described above.

Figure 6:
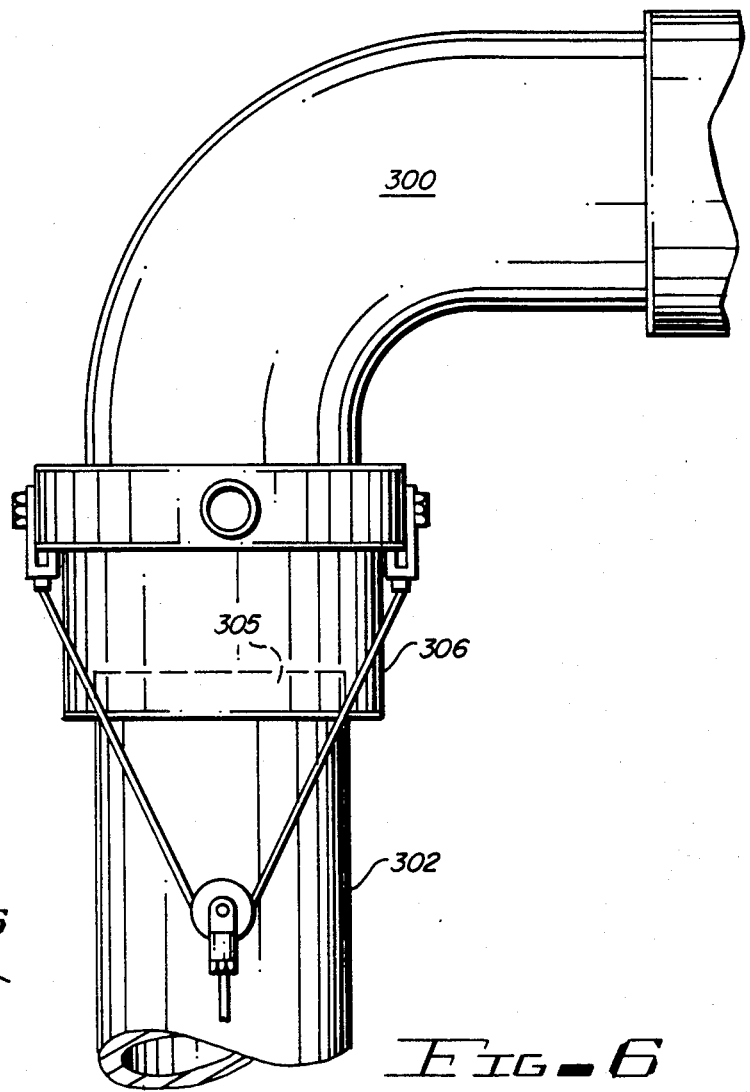
FIG. 6 is a detailed plan view showing one of the pipe engaging members in abutting relationship with the end of a pipe section.

In some instances, it may be necessary to remove the bearing plate attachment 16 from the second pipe engaging member 14. Referring to FIG. 6, elbow 300 is positioned to be joined to pipe section 302. It is normal in this instance that the fitting or collar generally associated with pipe section 302 has been removed so section 302 now has a straight end 305. Elbow 300 is provided with collar 306 which must be moved in the direction of the arrow to assemble the pipe sections. In this situation, the second engaging pipe member with the winch is positioned in abutment the next adjacent with collar on pipe section 302 and the second pipe engaging member is placed with its collar 150 in abutment immediately behind collar 306. As the winch is actuated, collar 306 is urged in the direction of the arrow for assembly and sealing engagement.

The tool of the present invention is highly versatile and may be fabricated from a wide variety of conventionally available materials such as cast iron, cast steel, aluminum and the like. Aluminum is prefered because of its light weight and its durability to withstand the forces generally encountered in joining pipe sections.

From the foregoing it will be seen that the present invention provides an efficient, light-weight and high versatile effective pipe joining tool. The tool can be used with various types of pipe and in the various assembly situations generally encountered in the pipe laying industry. In addition, the device adapts for use both in the trench and out of the trench to facilitate rapid construction.

Various modifications and changes will become obvious to those skilled in the art. It is the intent these changes and modifications are to be encompassed within the spirit and scope of the apendent claims and that the invention described herein and shown in the figures of the asscompanying drawings are illustrative only and are not intended to limit the scope of the invention.

I claim:

1. An apparatus for moving the end of a second pipe section into sealing engagement with the collar of a first pipe section having an annular seal therein, said apparatus comprising:
    (a) a first pipe engaging member including:
        (i) a collar adapted to complimentarily engage at least a portion of the outer diameter of said first section in a position in abutment with the associated hub; and
        (ii) winch means carried on said first pipe engaging member;
        (iii) cable means having a first end connected at said winch;
    (b) a second pipe engaging member including:
        (i) a collar adapted to complimentarily engage at least a portion of the outer diameter of said second pipe section;
        (ii) a yoke pivotally attached to said collar at first pivot locations; and
        (iii) said cable having a second end secured to said yoke at pivot locations offset from said pivot locations whereby actuation of said winch will exert a joining force between said first and second pipe engaging members.

2. The apparatus of claim 1 wherein said first and second pipe engaging tools are each provided with removable handles.

3. The apparatus of claim 1 wherein each of said first and second pipe engaging tools are connected to said cable at a bridle and pulley.

4. The apparatus of claim 3 wherein the said bridle associated with said first tool comprises a section of flexible cable having one end secured to the member and extending around a pulley at opposite sides of said collar and terminating at said winch.

5. The apparatus of claim 1 further including bearing plate means detachably securable to the collar of said second pipe engaging member.

6. The apparatus of claim 1 further including means for selectively locking said yoke and collar of said second member as a unit.

* * * * *